UNITED STATES PATENT OFFICE.

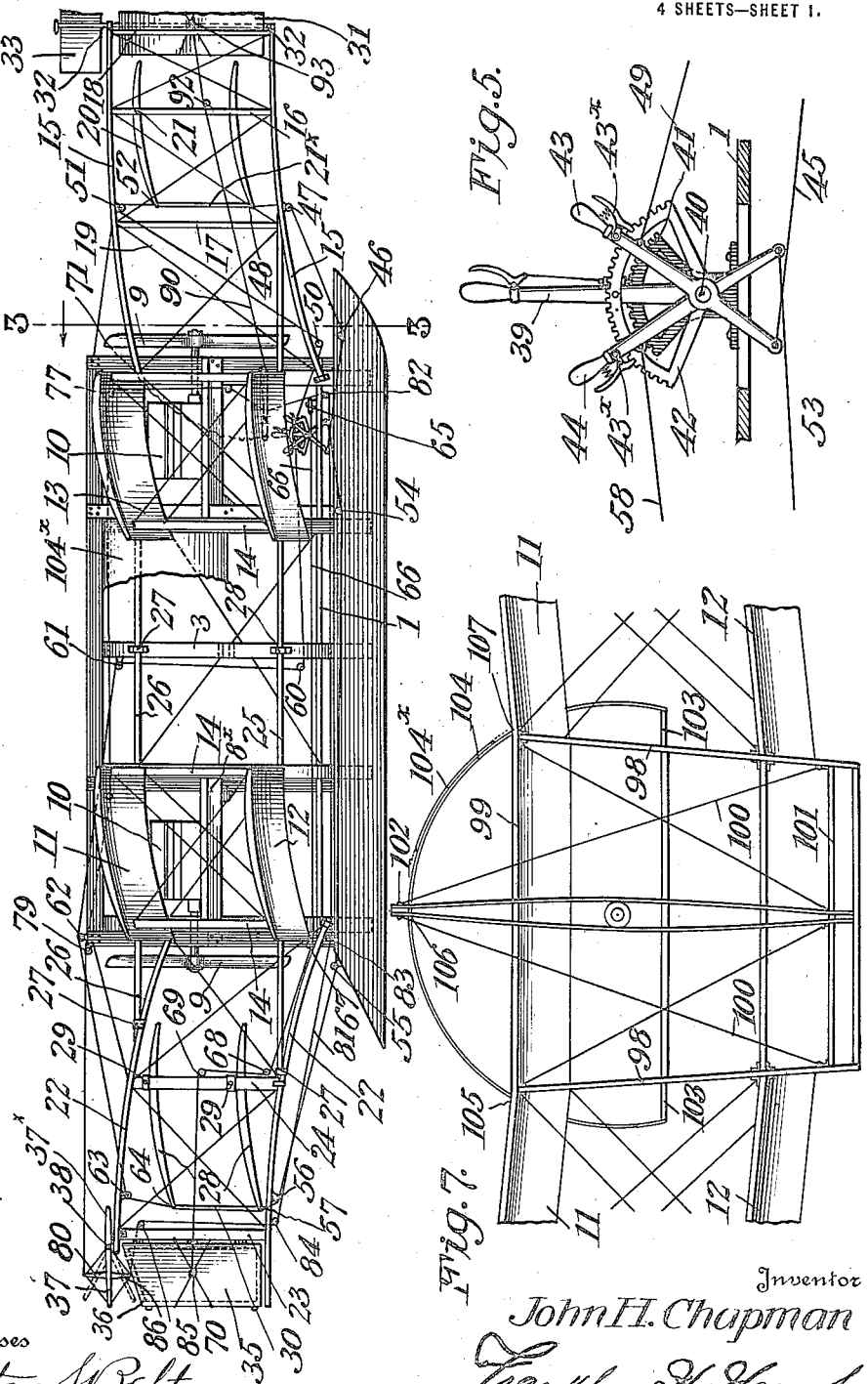

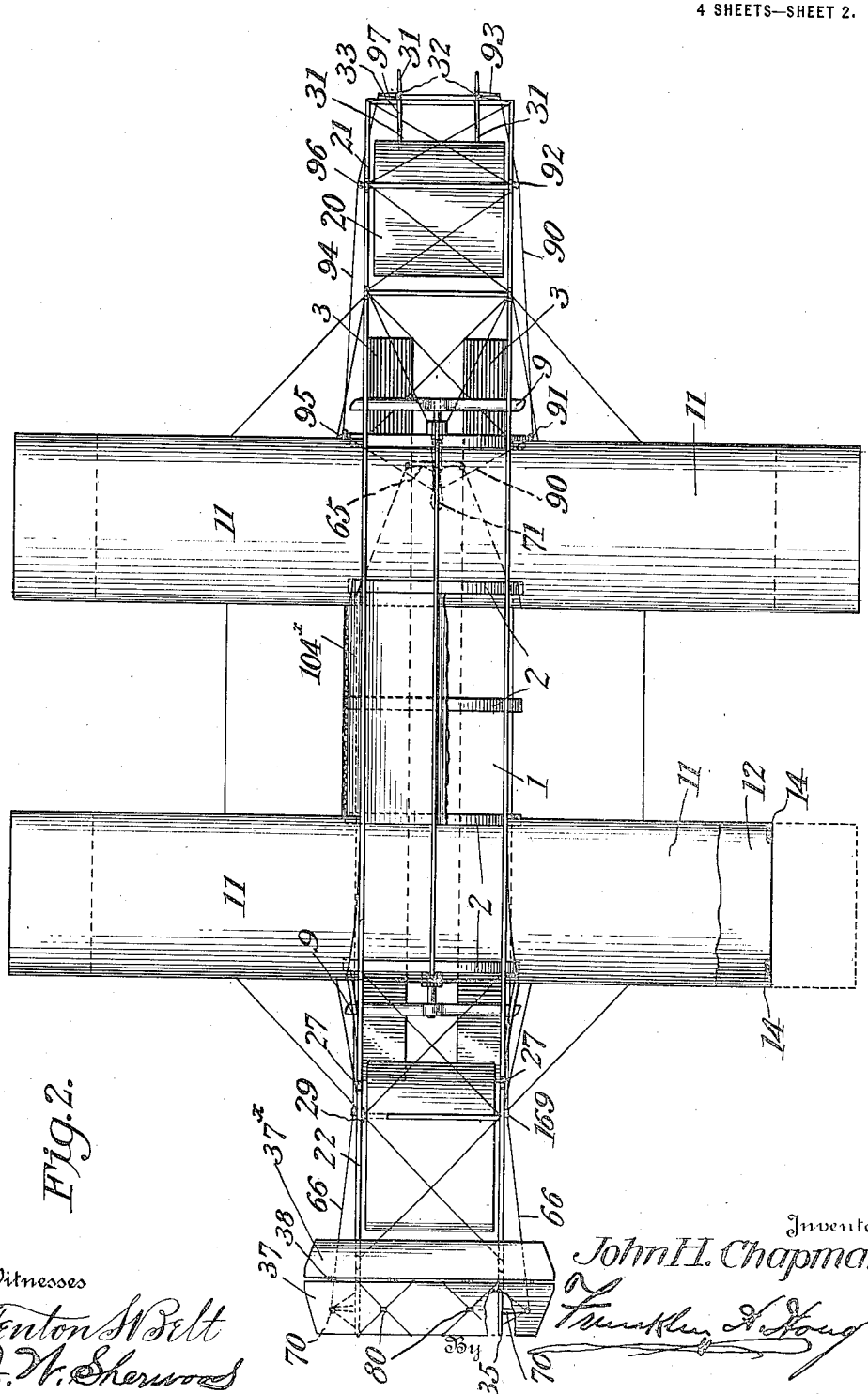

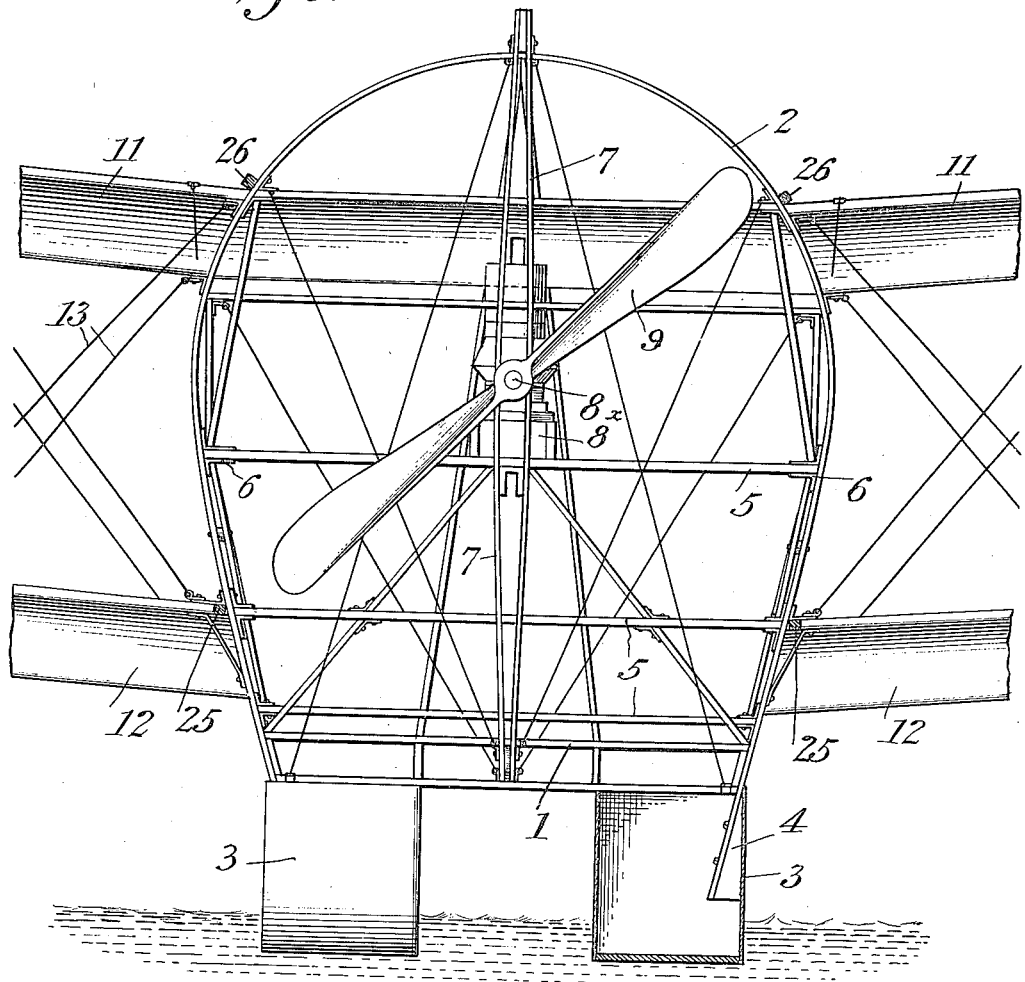
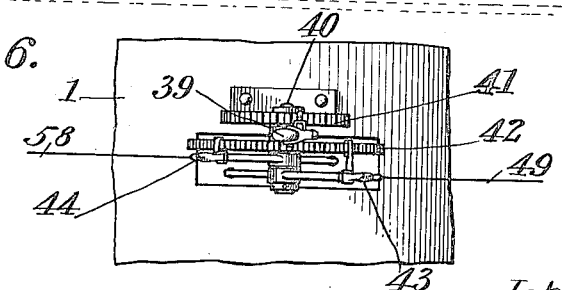

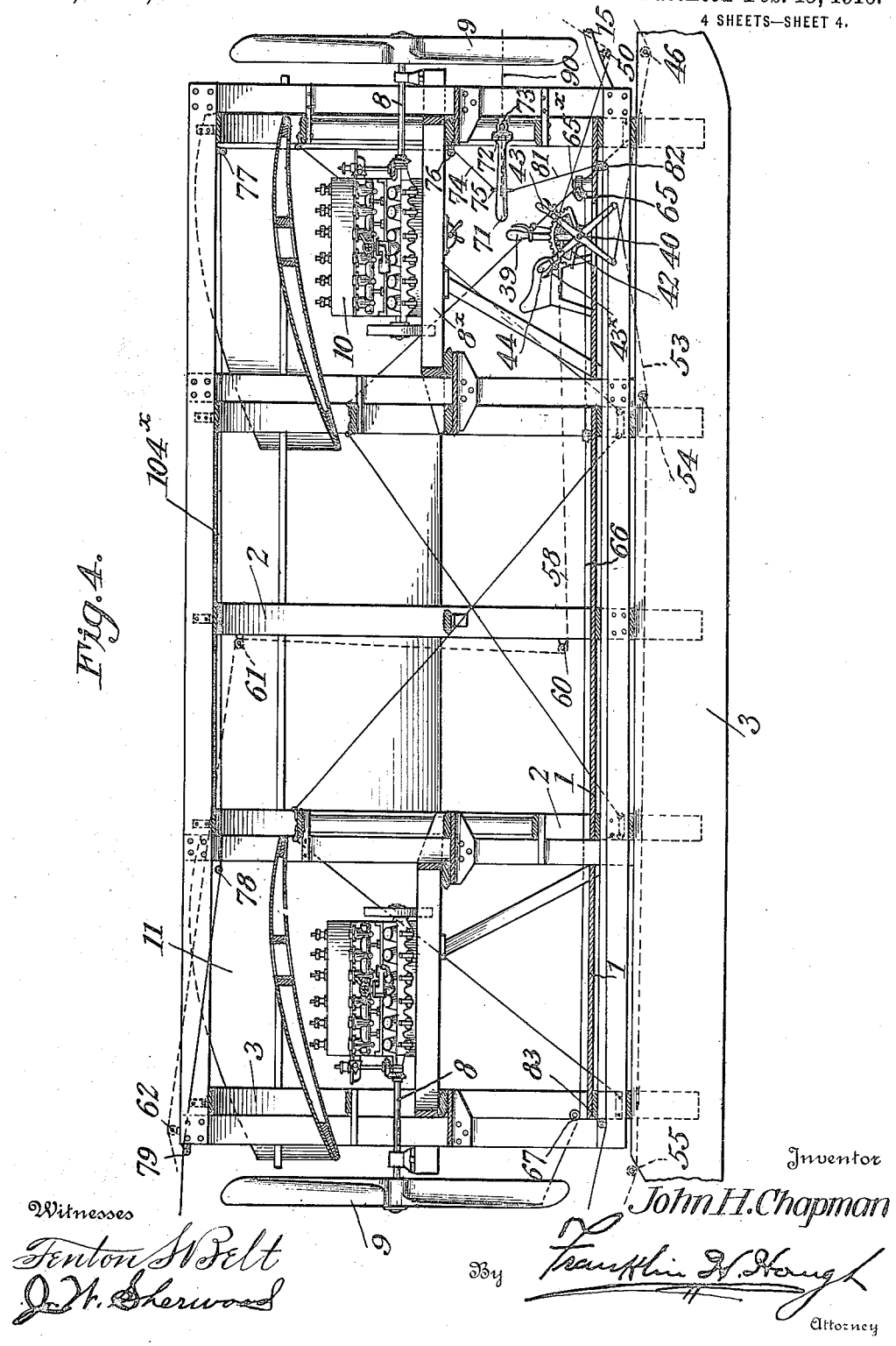

JOHN H. CHAPMAN, OF MIDDLEPORT, NEW YORK, ASSIGNOR, BY DIRECT AND MESNE ASSIGNMENTS, TO RICHARDSON AEROPLANE COMPANY, INC., OF NEW ORLEANS, LOUISIANA, A CORPORATION OF LOUISIANA.

HYDROAEROPLANE.

1,172,196.      Specification of Letters Patent.      Patented Feb. 15, 1916.

Application filed March 30, 1915. Serial No. 18,170.

*To all whom it may concern:*

Be it known that I, JOHN H. CHAPMAN, a citizen of the United States, residing at Middleport, in the county of Niagara and State of New York, have invented certain new and useful Improvements in Hydroaeroplanes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in hydro-aeroplanes and comprises essentially a bi-plane with motors arranged in tandem and in the provision of elevating and lowering planes movable independent of the main frame carrying the gliding planes.

Another feature of the invention consists in the provision of a tunnel running longitudinally of the frame and provided with a plurality of propellers arranged in tandem in alinement with the tunnel, the latter serving to direct the current of air against fixed planes to increase their efficiency, while the canopy or top of the tunnel will serve as a parachute.

Another feature of the invention resides in the provision of a balancing member positioned above the center of gravity of the apparatus and forming means for righting the craft in the event of its tilting in one direction or another.

Other features of the invention consist in the provision of controlling mechanism whereby the elevating planes may be moved independently or simultaneously and in the provision of various other details of construction, combinations and arrangements of parts which will be hereinafter fully described, shown in the accompanying drawings and then specifically defined in the appended claims.

My invention is illustrated in the accompanying drawings, in which:

Figure 1 is a side elevation of the apparatus. Fig. 2 is a top plan view. Fig. 3 is an enlarged sectional view on line 3—3 of Fig. 1 looking in the direction of the arrow. Fig. 4 is an enlarged central sectional view of the tunnel portion of the frame, parts being shown in elevation. Fig. 5 is an enlarged detail view of the lever control mechanism. Fig. 6 is a plan view of the control and levers. Fig. 7 is a sectional view showing a slight modification of the construction of the tunnel and frame.

Reference now being had to the details of the drawings by numeral, 1 designates the floor of the tunnel and 2 designate bowed members, the lower ends of which project below said floor and extend into the pontoons 3, being fastened by suitable means to the wedge-shaped blocks 4, projecting from the walls of the pontoons. Said bowed members are securely braced by the cross bars 5 held at their ends by suitable angle irons 6, and rising centrally from and secured to said cross bars are the bars 7 which are secured together at their upper ends and which support the propelling shafts 8 upon which the propelling wheels 9 are fixed, it being noted that there are two engines, designated by numerals 10, employed and which are securely held upon the supporting beams $8^x$. While two engines are shown having suitable propelling shafts, it will be understood that, if desired, both engines might be connected to a single shaft, or, if preferred, but one engine may be utilized, and positioned at any suitable location relative to the tunnel frame. Said propellers are positioned one near the forward end of the framework forming the tunnel and the other adjacent to the rear end and are arranged in tandem, as will be noted, although it will be understood that the propellers may be positioned at other locations, if desired, without in any way departing from the spirit of the invention.

Upon reference to Figs. 1 and 2 of the drawings, it will be noted that there are two sets of gliding planes upon each side of the frame and designated respectively by numerals 11 and 12 and arranged in pairs, the planes 11 being directly over the lower ones 12, said planes being fixed rigidly to the frame and suitably braced with guy wires 13. The said planes, one above the other, are held in parallel relation by means of struts 14. It will be noted upon reference to Fig. 3 that the upper planes are continuous with each other, extending across the upper portion of the tunnel part while the planes 12 terminate at and are secured to the bowed members 2. It will also be noted that the lower planes, as shown in dotted lines in Fig. 2, are somewhat shorter than the planes above. Projecting forward from the tunnel frame are the bars 15 between which the struts 16, 17 and 18 are fastened and which are securely reinforced by the guy wires 19. Elevating and lowering planes, designated by numeral 20, are mounted between the struts 16, and 21 designate pivots projecting from the opposite side of each plane 20 and which are mounted in suitable bearings in the struts 16, and the rear ends of the planes 20 are connected together by means of strips 21×, securely holding the same in parallel relation. Projecting rearwardly from the opposite end of the tunnel frame are similar bars 22 which are connected and held rigidly in place by means of the struts 23 and 24. Said bars 22 and 15 are further reinforced and held in place by means of the two longitudinally disposed parallel bars 25 and 26, shown clearly in Fig. 1 of the drawings, and which are secured to the bowed members 2 by means of the clips 27. Raising and lowering planes, designated each by numeral 28, are provided with pivots mounted in bearings 29 in the struts 24, opposite each other, and their rear ends are fastened together by vertically disposed strips 30, the said planes 28 coöperating with the planes 20 at the forward end of the craft for the purpose of causing the hydro-aeroplane to be raised or lowered without causing the main frame to be tilted. At the extreme forward ends of the bars 15 are pivotally mounted the laterally steering rudders 31, each mounted upon a vertically disposed shaft 32, journaled in suitable bearings in said bars 15, and to the upper end of each shaft 32 is fixed a balancing and steering member 33 which are positioned above the upper of the bars 15 and also above the center of gravity of the apparatus in order to get a greater leverage upon the air in righting the craft in the event of its tilting in one direction or the other. At the rear ends of the strips 22 are pivotally mounted the vertically disposed rudders 35, pivotally connected to the struts 23, and the upper end of each rudder 35 is inclined as shown at 36 so that it will not interfere with a horizontally disposed rear elevating plane 37, pivotally mounted by pivots 38 upon the edge of a stationary plane 37×.

Referring to Figs. 4, 5 and 6 will be seen the mechanism for controlling the various elevating planes and steering rudders and which consists of a central lever 39 which is pivotally mounted upon a pivot 40 and adjacent to said lever is a fixed segment 41, the teeth of which are adapted to be engaged by a pawl carried by the lever 39. A second gear segment is fastened to the shank portion of the lever 39 and is designated by numeral 42 and moves with said lever as the same is swung upon its pivot. Mounted on the common pivot 40 are two other levers, designated by numerals 43 and 44, each carrying a pawl 43× for engagement with the teeth of the segment 42. A cable 45 is fastened to the lower end of the lever 43 and passes over pulleys 46 and 47 and is secured at 48 to the rear end of the lower plane 20. A second cable, designated by numeral 49, is fastened to the arm of the lever 43 above its pivotal point and passes over a pulley 50, thence over a pulley 51 secured to one of the bars 15 and its other end is secured at 52 to the rear end of the upper of the planes 20. A cable 53 is fastened to the lower end of the lever 44 and passes about the pulleys 54, 55 and 56 and is secured at 57 to the rear end of the lower of the planes 28. A cable 58 is fastened to the arm of the lever 44 above its pivotal point, passes over the pulleys 60, 61, 62 and 63 and is fastened at 64 to the rear end of the upper of the planes 28. The means for operating the rear steering rudders 35 consists of a foot-operated lever 65, pivotally mounted upon a pin 65×, which has pivotally connected thereto a cable 66 running rearwardly about pulleys 67, 68 and 69 and is secured to an arm 70 projecting from the outer face of the steering member 35. Upon reference to Fig. 2, it will be noted that there are two of said cables 66, similarly connected, one to each end of the foot-operated lever, it being connected to a steering rudder 35. A lever, designated by numeral 71, is pivotally mounted to have a lateral movement upon a knuckle 72 which in turn is pivotally mounted upon a bracket member 73, thus giving the knuckle and handle a vertical movement. A cable 74 is fastened at 75 to the lever 71 and passes about the pulleys 76, 77, 78 and 79 and is fastened to an arm 80 upon the horizontally pivoted elevating and lowering plane 37. Another cable, designated by numeral 81, is fastened to the lever 71 diametrically opposite the connection of the cable 74 therewith and passes about the pulleys 82, 83, 84 and 85 and is fastened to an arm 86 projecting from the under surface of the horizontal elevating plane 37. A cable 90, shown in Fig. 2, is fastened to the lever 71 and passes about pulleys 91 and 92 and is secured to an arm 93 upon the forward steering rudder 31 and a similar cable 94 is also fastened to the lever 71 and passes about pulleys 95 and 96 and is fastened to an arm 97 upon the other of the steering rudders 31.

In Fig. 7 of the drawings, I have shown a slight modification of the structural form of the machine in which, instead of the bowed members shown in the other figures, a rectangular outlined frame is provided consisting of the inclined struts 98 which are connected at their upper ends with the cross-piece 99, and guy wires 100 connect the sills 101 with the tops of the uprights 102, and projecting from the inclined struts 98 are the arms 103 to which the ends of the bowed members 104 are fastened which are also fastened at the points, designated by numerals 105, 106 and 107. In this modified form, a covering or canopy 104$^x$ is supported by the bowed members, the strain upon the machine, however, coming upon the struts rather than being shared by the form of bowed members illustrated in the other figures of the drawings.

In operation, when it is desired to elevate the craft, the operator may cause the elevating planes 20 and 28 to be tilted to offer resistance to the air, the mechanism provided being such as to cause the two sets of planes 20 and 28 to be moved together in unison or each separately. In the event of it being desired to cause both sets of elevating planes to be moved together, the lever 39 is swung upon its pivot 41, it being understood that the two levers 43 and 44 held in adjusted positions to the segment 42 will move with the lever 39 and, through the cable connections between the levers 43 and 44 with the said raising and lowering planes, the latter will be moved in unison. In the event of it being desired to move the forward set of elevating planes 20 independent of the rear set 28, it may be accomplished by the manipulation of the lever 43 moving independent of the other two levers, whereas, if it is desired to move the rear set of elevating planes 28 independent of the forward set, it may be accomplished by the manipulation of the lever 44 with its cable connection with said rear set of elevating planes. When it is desired to operate the forward steering rudders 31 upon their vertical axes, it is accomplished by a lateral swinging movement of the lever 71 and, through the medium of the cables 90 and 94, which are connected to the two rudders 31. In the event of it being desired to operate the rear horizontally pivoted raising and lowering plane 37, it is accomplished by a vertical swinging movement imparted to the lever 71 and the cables 74 and 81 connected to said steering member 37, it being understood that the balancing members 33 move with the steering members 31 and, being positioned above the center of gravity and somewhat longer than the said steering rudders 31, will offer a considerable resistance surface when utilized for the purpose of returning the apparatus to an even keel in the event of the machine being tilted. The rudders 35 are swung in unison by the tilting movement of the foot lever 65 and the cables intermediate the same and said rudders 35.

By the provision of an hydro-aeroplane made in accordance with my invention, it will be understood that the principle of the tunnel affords means not only for directing the current against the fixed planes but the canopy top to the same will tend to serve the purpose of a parachute to check a sudden downward movement of the apparatus and, by the provision of the tilting planes arranged in pairs fore and aft, the machine, when in operation, may be elevated or lowered without the necessity of tilting the machine as is commonly necessary in apparatus as now constructed.

What I claim to be new is:

1. A hydro-aeroplane comprising a tunnel frame, propellers mounted tandem and centrally in alinement with the tunnel frame, fixed planes passing through the tunnel frame and projecting beyond the sides thereof, movable elevating and lowering planes mounted in pairs in advance of and at the rear of the tunnel frame, and means for operating the same.

2. A hydro-aeroplane comprising a tunnel frame, propellers mounted tandem and centrally in alinement with the tunnel frame, fixed planes passing through the tunnel frame and projecting beyond the sides thereof, movable elevating and lowering planes mounted in pairs in advance of and at the rear of the tunnel frame, and mechanism for operating said elevating and lowering planes independently or in unison in pairs.

3. A hydro-aeroplane comprising a tunnel frame, propellers mounted tandem and centrally in alinement with the tunnel frame, fixed planes passing through the tunnel frame and projecting beyond the sides thereof, movable elevating and lowering planes mounted in pairs in advance of and at the rear of the tunnel frame, a pivotal lever having cable connections with the two sets of elevating and lowering planes, a segment member fixed to said lever, and other levers independent of each other for controlling independently the sets of elevating and lowering planes.

4. A hydro-aeroplane comprising a tunnel frame, propellers mounted tandem and centrally in alinement with the tunnel frame, fixed planes passing through the tunnel frame and projecting beyond the sides thereof, movable elevating and lowering planes mounted in pairs in advance of and at the rear of the tunnel frame, a pivotal lever having cable connections with the two sets of elevating and lowering planes, a segment member fixed to said lever, other levers, each having connections with distinct pairs of the elevating and lowering planes and movable with said segment member as the first mentioned lever is operated.

5. A hydro-aeroplane comprising a tunnel frame, propellers mounted tandem and centrally in alinement with the tunnel frame, fixed planes passing through the tunnel frame and projecting beyond the sides thereof, movable elevating and lowering planes mounted in pairs in advance of and at the rear of the tunnel frame, a pivotal lever having cable connections with the two sets of elevating and lowering planes, a segment member fixed to said lever, other levers and pawls carried thereby for engagement with the teeth of said segment member and movable with the latter as the first mentioned lever is actuated.

6. A hydro-aeroplane having a tunnel frame, fixed gliding planes passing through said frame and projecting beyond the sides thereof, propellers arranged in tandem and centrally with reference to the tunnel frame, movable elevating and lowering planes arranged in pairs, one set in advance of the tunnel frame and the other at the rear thereof and in alinement with the tunnel, means for operating said movable planes together as well as independent of each other in pairs, a vertically pivoted balancing plane positioned above the center of gravity of the machine, and means for operating said balancing plane.

7. A hydro-aeroplane having a tunnel frame, fixed gliding planes passing through said frame and projecting beyond the sides thereof, propellers arranged in tandem and centrally with reference to the tunnel frame, movable elevating and lowering planes arranged in pairs, one set in advance of the tunnel frame and the other at the rear thereof and in alinement with the tunnel, means for operating said movable planes together as well as independent of each other in pairs, vertically pivoted steering rudders mounted fore and aft upon the frame, and means for actuating said rudders.

8. A hydro-aeroplane having a tunnel frame, fixed gliding planes passing through said frame and projecting beyond the sides thereof, propellers arranged in tandem and centrally with reference to the tunnel frame, movable elevating and lowering planes arranged in pairs, one set in advance of the tunnel frame and the other at the rear thereof and in alinement with the tunnel, means for operating said movable planes together as well as independent of each other in pairs, vertically pivoted steering rudders mounted fore and aft upon the frame, means for actuating said rudders, and a vertically pivoted balancing plane movable with the forward steering rudders and positioned above the center of gravity of the apparatus.

9. A hydro-aeroplane having a tunnel frame, gliding planes arranged in pairs, the upper planes passing through said frame and projecting beyond the sides thereof, the lower planes of each set projecting laterally from the sides of the frame, propellers rotatably mounted centrally in alinement with the tunnel frame, one at each end thereof, movable elevating and lowering planes arranged in pairs, one set in advance of the other, one set being at the rear of the tunnel frame and in alinement therewith and the other set in advance of the tunnel, means for operating said elevating and lowering planes, and means for steering the apparatus.

10. A hydro-aeroplane having a tunnel frame, gliding planes arranged in pairs, the upper planes passing through said frame and projecting beyond the sides thereof, the lower planes of each set projecting laterally from the sides of the frame, propellers rotatably mounted centrally in alinement with the tunnel frame, one at each end thereof, movable elevating and lowering planes arranged in pairs, one set in advance of the other, one set being at the rear of the tunnel frame and in alinement therewith and the other set in advance of the tunnel, means for operating said elevating and lowering planes, vertically mounted steering rudders at the forward and rear ends of the apparatus, a horizontally pivoted elevating and lowering rudder at the rear end of the apparatus, and lever mechanism for operating the same.

11. In a hydro-aeroplane, a tunnel frame having ribs projecting below the floor thereof, pontoons secured to said floor and into which the ends of the ribs extend, blocks fastened to the wall of the pontoon and to which said ribs are fastened, gliding planes fixed to the frame and extending laterally therefrom, movable elevating and lowering planes pivotally mounted on extensions of the frame in pairs in front and at the rear of the tunnel frame, means for operating said planes independently and together, steering rudders, and means for operating the same.

12. In a hydro-aeroplane, a tandem bi-plane comprising a frame, gliding planes arranged in pairs and projecting laterally from the frame, propellers adjacent to the planes, movable elevating and lowering planes adjacent to the ends of the frame, means for operating the same, steering rudders and means for operating the same, a horizontally mounted elevating and lowering plane positioned over the rear steering rudders, and mechanism for operating said steering plane.

In testimony whereof I hereunto affix my signature in presence of two witnesses.

JOHN H. CHAPMAN.

Witnesses:
W. FRANK COBB,
GEORGE U. MCNAIR.